US008754889B2

(12) United States Patent
Haub et al.

(10) Patent No.: US 8,754,889 B2
(45) Date of Patent: Jun. 17, 2014

(54) CURSOR SYNCHRONIZATION IN A PLURALITY OF GRAPHS

(75) Inventors: Andreas Peter Haub, Roetgen (DE); Sven Johannsen, Aachen (DE)

(73) Assignee: National Instruments Corporation, Austin, TX (US)

( * ) Notice: Subject to any disclaimer, the term of this patent is extended or adjusted under 35 U.S.C. 154(b) by 837 days.

(21) Appl. No.: 12/406,155

(22) Filed: Mar. 18, 2009

(65) Prior Publication Data
US 2010/0238174 A1 Sep. 23, 2010

(51) Int. Cl.
*G06T 11/20* (2006.01)

(52) U.S. Cl.
USPC .......................................................... 345/440

(58) Field of Classification Search
CPC ..... G06T 11/206; G09G 1/162; G06F 11/322
USPC .............................................. 345/440, 440.1
See application file for complete search history.

(56) References Cited

U.S. PATENT DOCUMENTS

| | | | |
|---|---|---|---|
| 5,307,455 A | 4/1994 | Higgins et al. | |
| 5,854,634 A * | 12/1998 | Kroitor | 345/473 |
| 5,898,307 A * | 4/1999 | Taraki et al. | 324/379 |
| 6,356,256 B1 | 3/2002 | Leftwich | |
| 6,369,819 B1 | 4/2002 | Pitkow et al. | |
| 6,967,652 B1 * | 11/2005 | Nubling et al. | 345/440 |
| 7,023,440 B1 * | 4/2006 | Havekost et al. | 345/440 |
| 7,191,184 B2 | 3/2007 | Laborde et al. | |
| 2004/0212616 A1 * | 10/2004 | Uthe | 345/440 |
| 2005/0177790 A1 * | 8/2005 | Molander et al. | 715/700 |
| 2008/0007555 A1 * | 1/2008 | Vrba et al. | 345/440 |

OTHER PUBLICATIONS

Corbin H., Synchronizing Multiple Cursors on Multiple Graphs, Feb. 24, 2009, National Instruments NI Developer Zone, 2 pages.*
Customizing Graphs and Charts, National Instruments LabVIEW 8.5 Help, Aug. 2007, pp. 1-9.*
"DIAdem Basics Course Manual, Course Software Version 11.0"; National Instruments; Feb. 2009; 536 pages.

* cited by examiner

*Primary Examiner* — Jeffery A Brier
(74) *Attorney, Agent, or Firm* — Meyertons Hood Kivlin Kowert & Goetzel, P.C.; Jeffrey C. Hood; Joel L. Stevens (57) ABSTRACT

Cursor synchronization in a plurality of graphs. A plurality of graphs may be displayed. Each graph may visually represent data and may include at least two axis. User input may be received specifying a value of a first axis of a first graph of the plurality of graphs. The method may determine if the first axis in the first graph corresponds to a first axis of a second graph in response to the user input. A visual indication may be indicated at a second value in the second graph in response to determining that the first axis in the first graph corresponds to the first axis of the second graph. The second value may correspond to the first value.

17 Claims, 6 Drawing Sheets

CURSOR SYNCHRONIZATION IN A PLURALITY OF GRAPHS

FIELD OF THE INVENTION

The present invention relates to the field of computer software, and more particularly to a system and method for cursor synchronization in a plurality of graphs.

DESCRIPTION OF THE RELATED ART

Technical Data Management (TDM) and visualization software in general allow a user to view a plurality of data graphs on a display. For example, a user may need to visualize data using multiple graphs (e.g., which include different measurements, units, comparisons, axis, etc.). Some previous visualization systems have updated cursor positions in multiple graphs regardless of the type of data or units displayed in each graph. For example, when a cursor position moves in a first graph, the visualization systems may correspondingly move the cursor position in the other graphs, but without any regard to the relationships of the data. Correspondingly, improvements in data visualizations are desired.

SUMMARY OF THE INVENTION

Various embodiments are presented of a system and method for cursor synchronization in a plurality of graphs.

A plurality of graphs may be displayed on a display, and each graph may include at least two axes. In various embodiments, the graphs may visually represent data, such as waveforms, measurements, and/or other types of data, as desired.

User input may be received which specifies a value of a first axis of a first graph. For example, a user may position a pointer, e.g., along the first axis within the first graph, or otherwise specify a value in the first graph.

In response, the method may determine if the first axis in the first graph corresponds to a first axis of a second graph (or other graphs). In some embodiments, the determination may be based on a previous association of axes of the first and second graphs. For example, user input may be received which specifies that the first axis of the first graph corresponds to the first axis of the second graph. Additionally, or alternatively, the method may automatically associate the first axis of the first graph with the first axis of the second graph. In one embodiment, the automatic association may be performed based on quantities, units, and/or labels of the axes in the graphs. For example, where the same quantities, units, and/or labels are used, axes may be automatically associated with each other.

In some embodiments, the determination of the two axes may focus on the specified first value, and a determination may be made if a second value, found in the second graph, corresponds to the first value. Thus, instead of specifically determining if the axes of the two graphs correspond, the method may simply determine if values of data found in the different graphs correspond. However, determining association of axes may be more efficient and/or simpler to compute and maintain. Thus, the determination may depend on various factors, such as units of the axes or the specified value, labels of the axes, etc.

If the two axes correspond, a visual indication (such as a cursor) may be displayed at a second value in the second graph, wherein the second value corresponds to the first value. Thus the visual indication in the second graph may be moved from its current location to a new location based on the user's movement of a visual indication in the first graph. For example, where the first value represents a certain value at a specific time (e.g., shown along the x axis), the second value may be a different value at that same specific time (e.g., also shown along the x axis). Thus, in graphs which correspond to each other, the user may be able to view multiple data points which correspond to each other by manipulating a single cursor instead of a plurality of cursors in the graphs. Stated another way, when the user moves a cursor in a first graph to a first data point, cursors in other corresponding graphs may be automatically moved accordingly as described herein.

Similarly, where the axis of the first graph corresponds to a video, the video may be moved to a frame corresponding to the value specified in the first graph. For example, where the first graph has a time axis and the video frames correspond to values of time, the video may be moved to the frame of the time specified in the first graph.

However, where a graph does not have corresponding values or axes, an indication may not be displayed in such a graph. For example, if it is determined that a third graph does not have a corresponding value or axis, then a visual indication may not be displayed at a new value in the third graph. For example, the third graph may have a displayed cursor, but it may not change in response to the user input specifying the value in the first graph.

The method described above may be embodied as a computer program, e.g., as program instructions stored on a memory medium which are executable by a processor to perform the method above. Similarly, a computer system may be configured to execute such program instructions to perform the method, as desired.

BREIF DESCRIPTION OF THE DRAWINGS

A better understanding of the present invention can be obtained when the following detailed description of the preferred embodiment is considered in conjunction with the following drawings, in which:

FIGS. 3A-5D are exemplary screen shots corresponding to the method of FIG. 2, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Patent Publication No. 2007/0038592 A1 (Ser. No. 11/461,627) titled "Method for Indexing File Structures in an Enterprise Data System," filed Aug. 1, 2006, whose inventors are Andreas Peter Haub, Stefan Romainczyk, Ralf Deininger and Helmut J. Helpenstein, Andreas Krantz and Myrle Krantz; and U.S. Pat. No. 4,914,568 titled "Graphical System for Modeling a Process and Associated Method," issued on Apr. 3, 1990.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Figure 1:
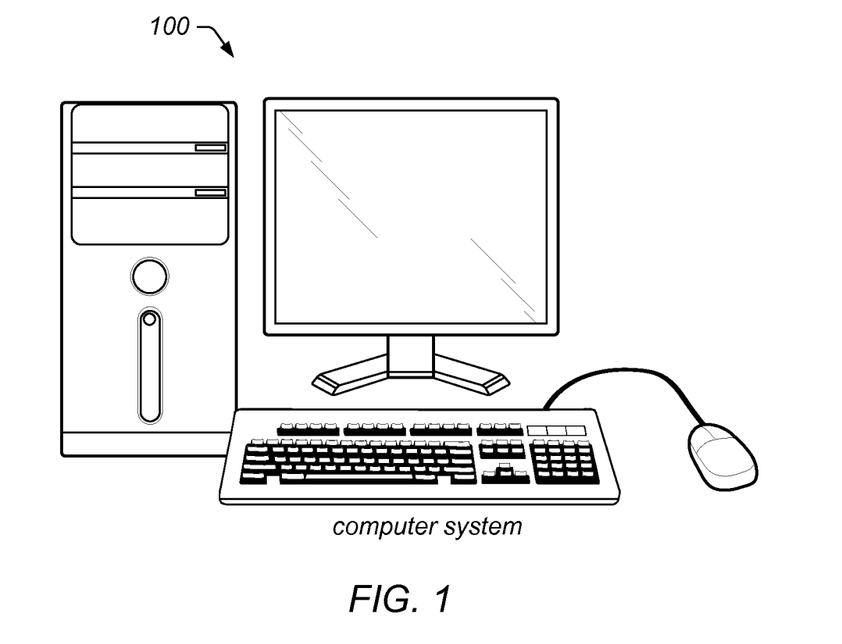
FIG. 1 illustrates a computer system operable to operate according to various embodiments of the present invention.

FIG. 1—Computer System

A representative hardware platform for practicing the methods described herein is depicted in FIG. 1, which illustrates an exemplary computer system 100. The computer system 100 may execute computer programs which may be stored on volatile or non-volatile memory. In various embodiments, the computer system 100 may comprise a desktop computer, a laptop computer, a palmtop computer, a network computer, a personal digital assistant (PDA), an embedded device, a smart phone, or any other suitable computing device.

The computer system 100 may include at least one central processing unit (CPU) or other processor(s), such as a conventional microprocessor, and a number of other units interconnected via a system bus. The CPU may include other circuitry, such as circuitry commonly found within a microprocessor, e.g., execution unit, bus interface unit, arithmetic logic unit, etc. The CPU may be coupled to a memory medium, which may include random access memory (RAM), read only memory (ROM), disk units, tape drives, and/or optical drives, among other types of memory mediums. The disk units, tape drives, and optical drives may be coupled to the CPU via an input/output (I/O) adapter. These peripheral devices may be coupled to the adapter which may be connected via a peripheral bus to a main bus, in one embodiment.

The CPU may be configured to execute program instructions (e.g., stored on one or more of the memory mediums above) which implement the system and methods described herein. For example, the computer system 100 (e.g., using the CPU) may be configured to execute program instructions associated with a technical data management (TDM) system as described in U.S. Patent Publication Number 2007/0038592, which was incorporated by reference in its entirety above. Additionally, the computer system 100 may be configured to update cursor positions among a plurality of graphs, as described in more detail below.

The computer system 100 may be configured to connect to a data processing network (e.g., coupled via a communication adapter), which may be a wireless, galvanic wired, or optical media network with a star, ring, or other topology. The network may be representative of various types of possible networks, e.g., a local area network (LAN) or a wide area network (WAN), such as the Internet. The systems and methods described herein may be implemented in various embodiments on a plurality of heterogeneous or homogeneous networked computer systems, such as exemplary computer system 100, through one or more networks.

In various embodiments, the CPU 100 may also be coupled through the input/output bus to one or more input/output devices via one or more adapters. For example, the computer system may also include user interface adapter for connecting a keyboard, a mouse, and/or other user interface devices such as a touch screen device (not shown) to bus. Further included in computer system 100 may be the communication adapter to the data processing network. As shown, the computer system may be coupled to a display, e.g., via a display adapter of the computer system 100.

The computer system 100 may include a multimedia adapter for connecting to microphone and/or loudspeaker system. Other types of multimedia output and input devices, such as headphones and stereo speakers (not shown), may be used via analog or digital interfaces. In various embodiments, the computer system 100 may also include a track ball, a magnetic or paper tape reader, a tablet, a stylus, a voice recognizer, a handwriting recognizer, a printer, a plotter, a scanner, and any other devices for input and/or output.

Figure 2:
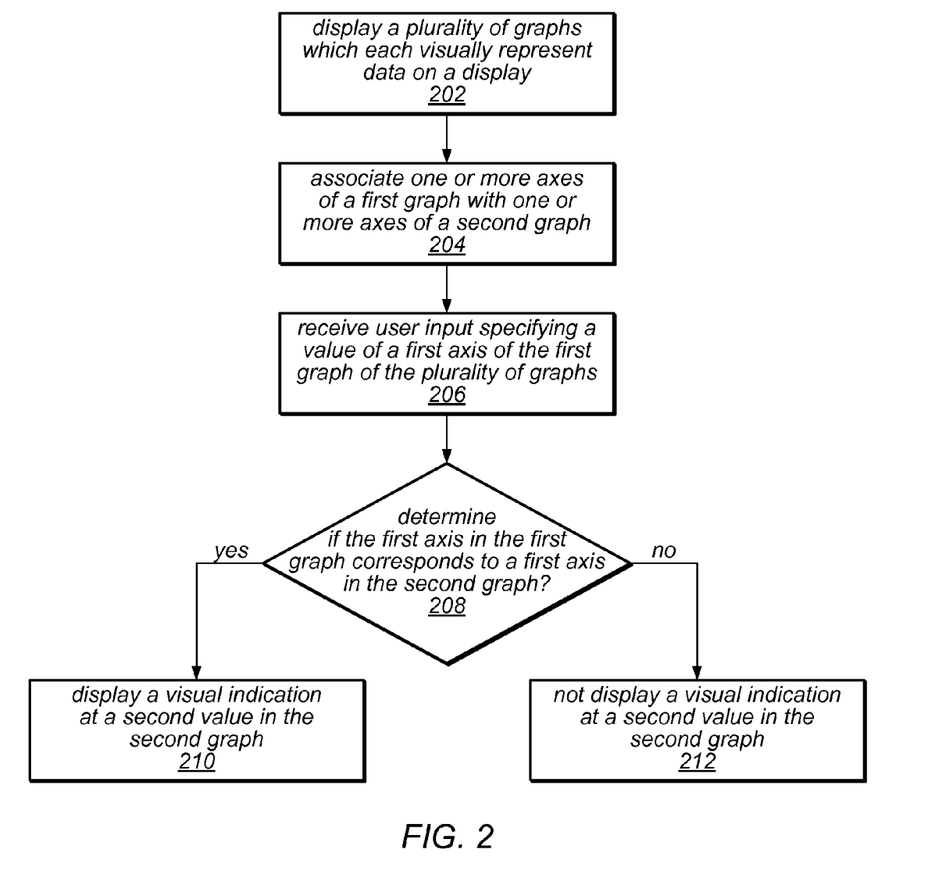
FIG. 2 is a flowchart diagram illustrating one embodiment of a method for cursor synchronization in a plurality of graphs.

FIG. 2—Cursor Synchronization in a Plurality of Graphs

FIG. 2 illustrates an exemplary method for cursor synchronization in a plurality of graphs. The method shown in FIG. 2 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Figure 3A:
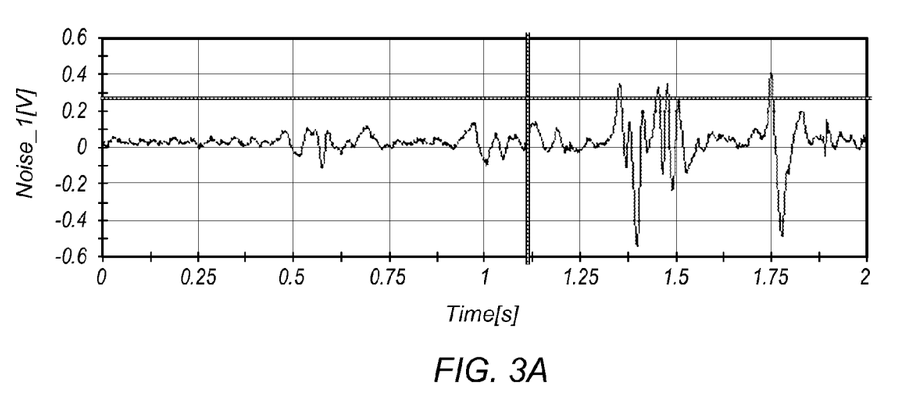
Figure 3B:
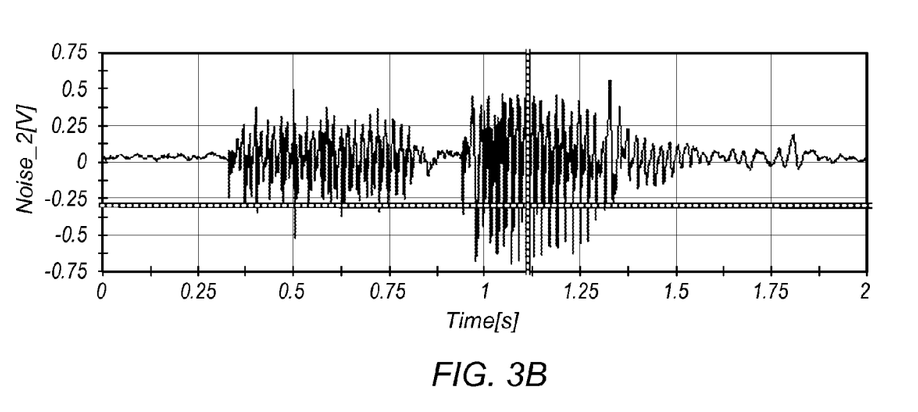

In 202, a plurality of graphs may be displayed on a display. Each graph may include at least two axes and may visually represent data (e.g., technical data, measurement data, etc.). For example, FIGS. 3A and 3B illustrate two graphs which may be displayed on the display. As shown in FIG. 3A, data showing Noise vs. Time may be displayed, and in FIG. 3B, different data showing noise vs. time may be displayed. Thus, in FIGS. 3A and 3B, the first axes (Time) may correspond and the second axes (Noise_1 [V] and Noise_2[V] respectively) may also correspond.

Figure 4A:
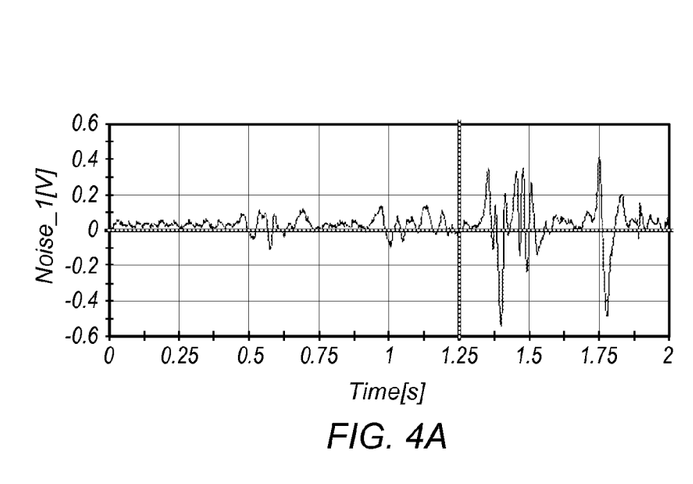
Figure 4B:
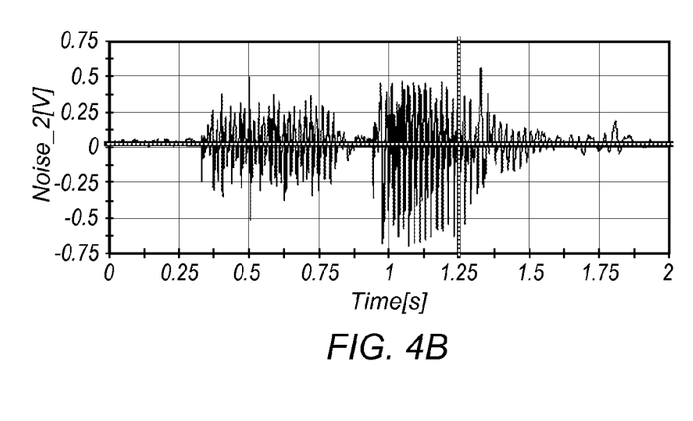

FIGS. 4A-4D illustrate an embodiment where a first two of four graphs correspond to each other (FIGS. 4A and 4B are the same as 3A and 3B), and the remaining two graphs (4C and 4D) correspond to each other, but the first two graphs and the second two graphs do not correspond to each other. More specifically, as shown, FIGS. 4C and 4D both include first axes (Frequency[Hz]) and second axes (Noise_1_Amplitude_peak[V]) which correspond to each other. For these specific graphs, 4C may be the fast Fourier transform (FFT) of 4A and 4D may be the FFT of 4B. The correspondence or association of axes is described in more detail below.

In some embodiments, the plurality of graphs may be displayed on the display in response to user input, e.g., specifically requesting data, such as waveforms, to be graphed on the display. For example, the user may select different graphs of a body of data (e.g., in a technical database of measurement data) for display. In one embodiment, the user select one or more measurements and graphs which visually represent data from the one or more measurements may be provided for display in 202. Note that while the examples given herein relate to graphs with two dimensions, further dimensional graphs may be provided for display, e.g., three dimensional graphs, or n-dimensional graphs (e.g., where the user may select which of the n dimensions are displayed).

In 204, one or more axes of a first graph may be associated with one or more axes of a second graph. In various embodiments, the association may be performed manually, in response to user input specifying the association, or automatically, where the association may be determined without user input specifying the association.

More specifically, in one embodiment, all graphs may be initially linked according to generic labels of axes. For example, two dimensional graphs may be linked according to the generic labels of the "x" axis and the "y" axis (and the "z" axis in three dimensional graphs). In this initial configuration, all graphs which include an "x" axis (or other axes) may therefore be associated with each other. Thus, in this configuration, the "x" axis of FIG. 4A (time) may be associated with the "x" axis of FIG. 4C (frequency) even though they have different units and values of the "x" axis in FIG. 4A do not directly correspond to values of the "x" axis in FIG. 4C.

The user may be able to manually specify the association of axes. For example, in one embodiment, the user may specify that the "x" axis of FIG. 4A is time, thereby assigning the axis of FIG. 4A as "time" instead of "x". The user may similarly specify that the "x" axis of FIG. 4B is also "time" instead of "x" thereby creating an association between these two axes of FIGS. 4A and 4B. Similarly, the user may associate the "Noise" axes of FIGS. 4A and 4B, the "Frequency" axes of FIGS. 4C and 4D, and the "Noise Amplitude Peak" axes of FIGS. 4C and 4D. However, in some embodiments, the user may only associate the axes of independent variables (e.g., time or frequency in the examples shown) rather than the axes of dependent variables (e.g., noise and noise amplitude peak in the examples shown).

In further embodiments, the user may be able to specify that two axes are associated, but not directly associated. For example, an axis in a first graph (e.g., natural log of time, ln(t)) may be derived from an axis in a second graph (e.g., time). The user may therefore specify that these two axes are associated by a formula. Thus, the user may be able to specify that one axis may be derived from another axis. More complicated associations are also possible, e.g., where the user may specify a formula for determining an axis value from another axis value. For example, a first graph may have an independent variable "x" (e.g., for Cartesian coordinates), and a second graph may have an independent variable "r" (e.g., for radians). These two variables may be linked by a formula rather than a simple direct correspondence. As another example, a second graph may have an axis that is defined as $[1/(1-x)]$. Thus, the user may be able to associate axes that may be derived from one another, e.g., by specifying the relationship (such as by formula) between the axes.

While the above descriptions relate to an embodiment where a user may manually specify or label axes of graphs to associate one axis with another axis, the user may be able to specify associations between axes of graphs in other manners. For example, the user may be able to graphically connect a first axis with a second axis, e.g., using a pointing device of a computer system displaying the graphs. More specifically, the user may draw a graphical connection (e.g., using a linking tool, possibly from a palette of tools) to associate the first axis and the second axis. Other methods for linking axes are envisioned.

As indicated above, the association between axes may be performed in an automatic fashion. As used here "automatic" refers to the process by which an action is performed without direct user input specifying the action. For example, automatic association of axes of the plurality of graphs is performed without any user input directly specifying the association of the axes, as was described above. However, it should be noted that automatic association may be performed in response to user input. For example, a user may request that automatic association be performed without manually specifying the association of axes, as described above. However, in alternate embodiments, the automatic association may be performed as soon as the graphs are displayed in 202, and may not require any user input to perform the automatic association.

For example, in an automatic association of the axes, the type of data displayed in each graph may be analyzed. More specifically, turning back to FIGS. 4A-4D, a computer system (e.g., in response to execution of program instructions) may determine the units or quantities associated with each axis of the plurality of graphs. In one embodiment, each axis which has the same units or quantities (as is the case for FIGS. 4A and 4B and 4C and 4D respectively) may be automatically associated, without user input manually specifying that association. Note that the specific units may not need to be the same. For example, as indicated above, quantities or types of units may be used to automatically associated axes. For example, while seconds and milliseconds may not be the same units, they are of the same quantity ("time") and may therefore be associated. Similarly, quantities such as "length", "area", etc. may be automatically associated.

Alternatively, or additionally, automatic association may compare labels of axes. In such a case, the automatic association may determine a difference between the "y" axes of FIGS. 4A and 4C even though they have the same units. Other meta data of the data displayed in each graph may be used to automatically associate an axis of a first graph with an axis of a second graph. Thus, various axes of the plurality of graphs may be associated with one another, e.g., in a manual or automatic fashion.

In some embodiments, the association described above (whether manual or automatic) may result in the creation of data structures which may be used for providing synchronizing cursors in the plurality of graphs as described below. For example, a data structure may be created for each type of identified axis, such as "x", "y", "z", "time", "frequency", "noise", and/or "noise amplitude peak", as described above (although any number of axes and associated labels are possible). These data structures may be used for publishing values and for updating cursor positions (among other possible visual indications), as described in more detail below.

In 206, user input may be received which specifies a value on a first axis of the first graph. For example, the user input may include a user positioning a pointer (e.g., of a pointing device such as a mouse) along an axis in a first graph. As shown in FIG. 3A, the user may position a cursor (or other visual indication) at the coordinate (1.25,0.02), e.g., by positioning the pointer at the value 1.25 along the x axis, by positioning the pointer at the value 0.02 along the y axis, or by specifically placing the pointer at the coordinates. In some embodiments, the cursor may trace the line of the graph by determining the user's pointer's x position in the graph. For example, regardless of the specific location of the pointer in the graph, the x axis value of the position of the pointer may be determined and an indication on the graph (shown as a crosshair, or moving intersecting lines in the examples shown, and referred to herein as a "cursor") may be shown which traces the line of the graph as the user moves his pointer. Thus, in such embodiments, the cursor may always follow the lines of the displayed graph. Where there are more than one lines on the graph, the cursor may be determined based on which line the proximity to the location of the pointing device. Alternatively, the user could specify the value textually, select a value in a table which corresponds to the values shown in the graph, etc. Thus, the user may specify a value for a first graph In 208, the method may determine if the first axis in the first graph corresponds to a first axis of the second graph. More specifically, the determination may be made based on the association of axes in 204 above. However, it should be noted that 204 may be performed at any appropriate time during the method (e.g., after 206, as desired).

In one embodiment, each time a new value or coordinate is specified in 206, data may be stored in corresponding data structure(s). For example, as described above in 204, a data structure may exist for each type of axis or label of axis. As one specific example, where the value is specified in the graph of FIG. 4A, e.g., by positioning a pointer in the graph of FIG. 4A, and the x axis has been designated "time", the value of the time (e.g., as specified by the pointer) may be stored in a corresponding "time" data structure (which may be referred to as "publishing" the value). In one embodiment, a signal (e.g., a software interrupt) may be sent to any other graphs which have an axis with the same designation (in this example, the x axis of FIG. 4B), and/or whose axis have a dependence on that axis (e.g., other axes who are defined as a formula of the designated axis, as indicated above). The signal may only be sent to those graphs which have an axis corresponding to the specified value. As an alternative, a polling mechanism may be used for each of the other graphs to determine if any data structures which correspond to its axis have been updated.

Note that while a data structure embodiment is described above for determining if the first axis in the first graph (and more particularly a specific change in value in a first graph) corresponds to an axis in a second graph (and more particularly to a new value in the second graph), other embodiments are envisioned, which may not require such a data structure. For example, any change in a graph may be propagated to other corresponding graphs, as stipulated in 204 above. Further embodiments are envisioned.

Note that the corresponding axis may not need to be the same axis as that in the first graph. For example, if a first graph has a "frequency" as its x axis and a second graph has "frequency" as its z axis, the determination (and corresponding update in 210) still applies.

In 210, if the first axis of the first graph corresponds to the first axis of the second graph, a visual indication (e.g., a cursor) may be displayed at a second value or coordinate in the second graph. More specifically, where axes correspond, when a new value is specified (as in 206) any axis which has corresponding values (as specified in 204 and determined in 208) may be updated to a new value or coordinate pair(s). Thus, among the plurality of graphs, input to a first graph results in changes to all corresponding other graphs.

In 212, if the first axis of the first graph does not correspond to the first axis of the second graph, a visual indication may not be displayed at a new value in the second graph. Thus, where an axes in a second graph do not correspond to axes in a first graph (where the change is being made), then no update to the second graph may be performed.

Note that while the above descriptions discuss a first graph and a corresponding (or not corresponding) second graph, the method may apply to any number of corresponding and not corresponding graphs. For example, all of the graphs may have corresponding axes (as is the case in FIGS. 3A and 3B), or only a portion of the graphs may have corresponding axes (as is the case for FIGS. 4A-4D and 5A-5D). Thus, where a second graph may have a corresponding axis, a third graph may not have a corresponding axis.

Figure 4C:
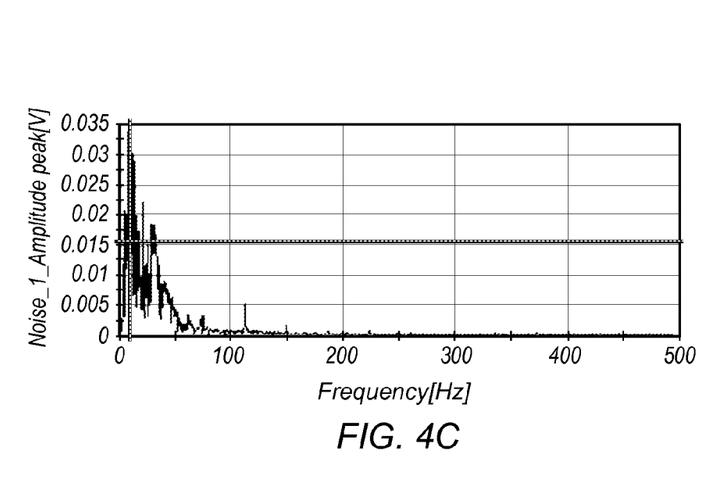
Figure 4D:
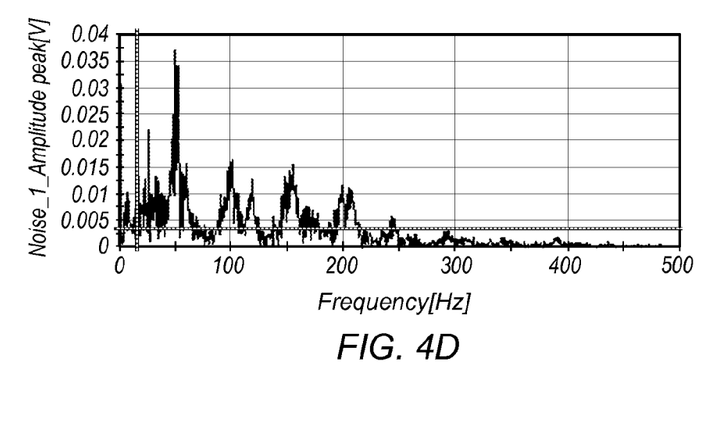

Turning more specifically to the examples shown in FIGS. 4A-4D, it is clear that if the cursor were synchronized between all four of the graphs (as is the case in some prior art systems), the resulting behavior does not make sense to the user (since the axes of FIGS. 4A and 4B do not correspond to the axes of FIGS. 4C and 4D). Instead, synchronization occurs between FIGS. 4A and 4B and separately between 4C and 4D. Thus, a change to 4A results in a corresponding change to 4B (since the axes of these two graphs are associated) and does not result in a change to either 4C or 4D (since the axes of 4A are not associated with axes in 4C or 4D). Similarly, a change to 4C results in a corresponding change to 4D (since the axes of these two graphs are associated) and does not result in a change to either 4A or 4B (since the axes of 4C are not associated with axes in 4A or 4B).

Thus, instead of a fixed x-x or y-y synchronization, the cursor position (which is modified in response to user input, e.g., using a pointer) may be published, e.g., to a data structure. Where the cursor is in a two dimensional graph, the x and y values of the cursor position may be published to corresponding data structures (although other embodiments are envisioned). Similarly, in a three dimensional graph, the x, y, and z values of the cursor position may be published. Correspondingly, any axes associated with the updated values (and therefore associated with the axis of the graph that the input was provided to) may "listen" for the change (e.g., via a software interrupt) and update the cursor in that graph.

Figure 5A:
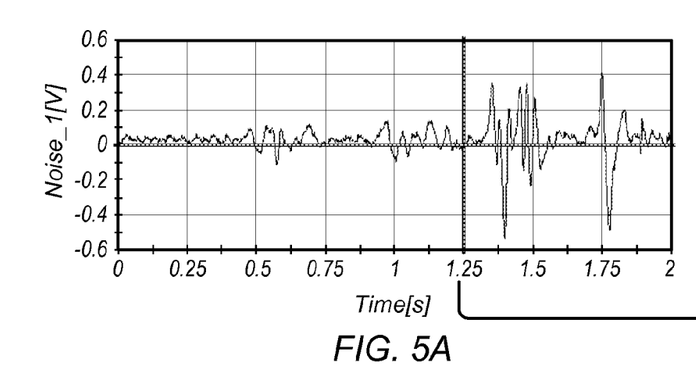
Figure 5B:
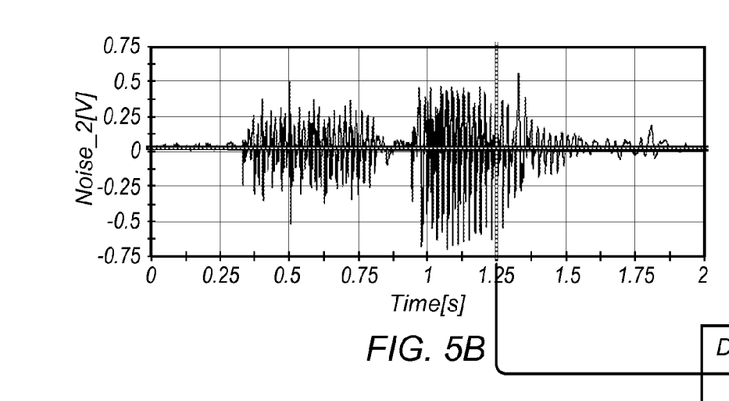

FIGS. 5A-5D provide a further example (based on the graphs of FIGS. 4A-4D. In this example, each graph may be, by default, configured to listen to default values "x", "y", and "z". In the case where no custom axes or labels are provided (either manually or automatically), all graphs would be linked regardless of data type. However, in the embodiment shown in FIGS. 5A-5D, the x axes of FIGS. 5A and 5B are linked to the "x" data structure shown in the "dispatcher" (e.g., which may be a data structure which stores all values for associated graphs). In this example, where the user provides input to FIG. 5A to move the cursor, the x value is published to the data structure "X". As shown in the graph, FIG. 5B is also associated with "X" and so the cursor of FIG. 5B "listens" to this change and correspondingly updates its position based on the change in FIG. 5A. However, the cursors in FIGS. 5C and 5D do not change since they are associated with the "Frequency" data structure (which may have been assigned manually or automatically, as desired) and not the "X" data structure.

Figure 5C:
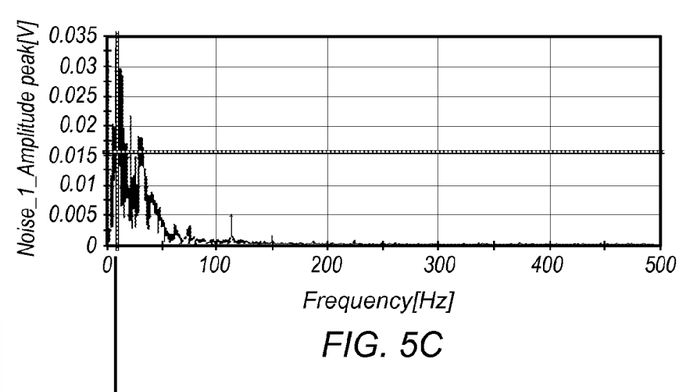
Figure 5D:
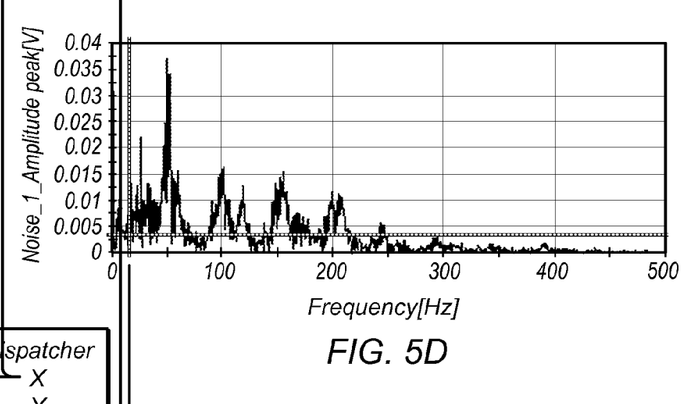

Similarly, any change of the cursor in FIG. 5C or 5D will result in corresponding changes in FIG. 5D or 5C respectively, but not to FIG. 5A or 5B since these are "listening" to the "X" data structure or "connector".

Thus, the above method allows for completely flexible parameterization of synchronization of cursors among a plurality of graphs. It allows for displaying a plurality of graphs on the same page, some of which are synchronized and some of which are not.

Further Embodiments

Figure 6:
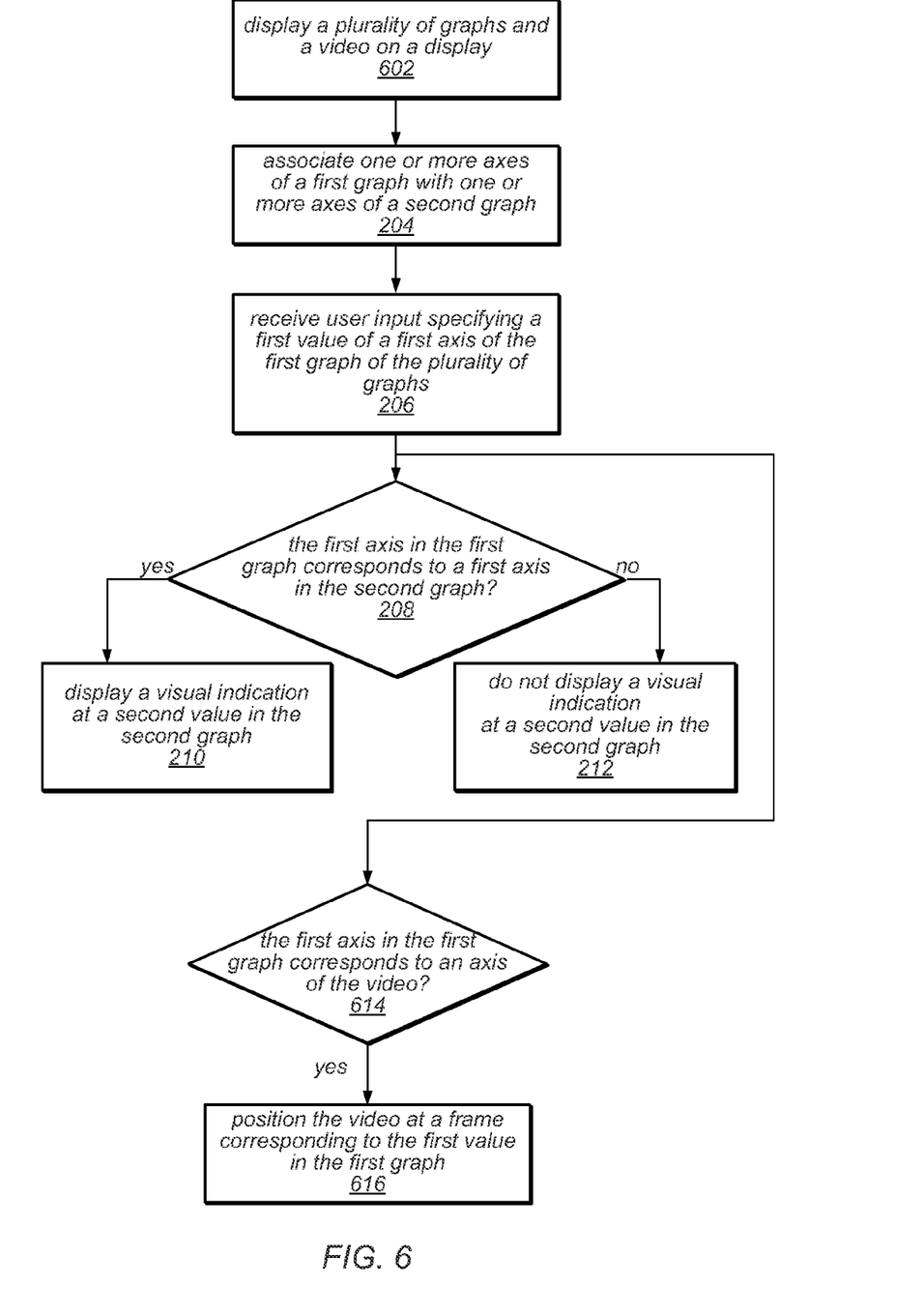
FIG. 6 is a flowchart diagram illustrating one embodiment of a method for cursor synchronization between a plurality of graphs and a video.

In addition to the plurality of graphs described above, the method may include displaying a video, e.g., in the same user interface as the plurality of graphs described above, as indicated in 602 of FIG. 6. The video may comprise an axis, e.g., time, to which frames are associated. For example, the video may have a frame associated with each second or particular units of time (e.g., every 1/30th of a second for a 30 fps video). Similar to the second graph described above, where the first axis (or value) of the first graph corresponds to the axis (or value) of the video, the video may be updated to reflect the video frame corresponding to the specified value. More specifically, as FIG. 6 shows, in addition to performing the method elements of FIG. 2 (204-212), the method may determine if the first axis in the first graph corresponds to an axis of the video, as indicated in 614, and if it does, may position the video at a frame corresponding to the first value in the first graph, as indicated in 616. For example, if the user specifies a value at 30 seconds in the first graph, the video frame (or frames) corresponding to that data point may be provided for display to the user. In some embodiments, the appropriate section of the video may be played for the user.

Note that while the axis of the video may correspond to the quantity "time", other units or quantities are envisioned. Additionally, the value of the first axis may not necessarily correspond to time, but a time or particular measurement may be determined based on the axis. For example, in one embodiment, the first graph may correspond to a particular measurement, but may not have a time axis. A video may be associated with the measurement, but may still use a time axis. Thus, in some embodiments, when the user specifies a value in the first graph, the video of the measurement corresponding to the first graph may be provided for display for the user. In some cases, the video may begin at the beginning or may start or "freeze" at a particular time or segment of video which particularly corresponds to the value specified in the first graph.

In even further embodiments, the user may provide input to a first video and other videos may be displayed at corresponding locations in their video. Thus, the user may specify a value using a video file and other videos may be displayed at corresponding values. Similarly, the user may specify the value using the video file and values on graphs may be updated corresponding to the video. For example, as the video plays, the indications provided in a plurality of corresponding graphs may be updated in real time with the video, as desired. Thus, the method described above may apply to videos as well as graphs.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible memory medium comprising storing program instructions, wherein the program instructions are executable by a processor one or more processors to:
   display a plurality of graphs which each visually represent data on a display, wherein each of the plurality of graphs includes at least two axes, wherein the plurality of graphs includes two or more graphs that each include a first axis of a first axis type, wherein the plurality of graphs further includes one or more additional graphs that do not have any axes of the first axis type;
   create a first data structure corresponding to the first axis type;
   for each respective graph of the two or more graphs, associate the first axis of the respective graph with the first data structure corresponding to the first axis type, wherein no graph of the one or more additional graphs is associated with the first data structure;
   in response to receiving user input specifying a first value of the first axis of a first graph of the two or more graphs, publish the first value to the first data structure;
   for each respective graph of the two or more graphs other than the first graph, send a respective notification to the respective graph indicating that the first value was published to the first data structure in response to determining that the first axis of the respective graph is associated with the first data structure; and
   for each respective graph of the two or more graphs other than the first graph, in response to receiving the respective notification indicating that the first value was published to the first data structure, update the respective graph by displaying a visual indication at a respective value of the first axis of the respective graph, wherein the respective value corresponds to the first value published to the first data structure; and
   wherein any graph of the one or more additional graphs is not updated in response to receiving the user input specifying the first value of the first axis of the first graph.

2. The memory medium of claim 1, wherein said receiving the user input specifying the first value of the first axis of the first graph comprises receiving user input positioning a pointer along the first axis of the first graph.

3. The memory medium of claim 1, wherein said displaying the visual indication at the respective value of the first axis of the respective graph comprises positioning a cursor along the first axis of the respective graph at the respective value.

4. The memory medium of claim 1,
   wherein the program instructions are further executable by the one or more processors to:
   display a video on the display with the plurality of graphs;
   determine if the first axis of the first graph corresponds to an axis of the video in response to the user input; and
   position the video at a frame corresponding to the first value of the first axis of the first graph in response to determining that the first axis of the first graph corresponds to the axis of the video.

5. The memory medium of claim 1, wherein for at least one respective graph of the two or more graphs other than the first graph, the respective value of the first axis of the respective graph is the same as the first value of the first axis of the first graph.

6. The memory medium of claim 1,
wherein the program instructions are executable by the one or more processors to perform said associating the first axes of the two or more graphs with the first data structure in response to determining that the first axes of the two or more graphs are associated with each other.

7. The memory medium of claim 6,
wherein said determining that the first axes of the two or more graphs are associated with each other comprises receiving user input directly specifying that the first axes of the two or more graphs are associated with each other.

8. The memory medium of claim 6,
wherein said determining that the first axes of the two or more graphs are associated with each other comprises automatically determining that the first axes of the two or more graphs are associated with each other without receiving user input directly specifying that the first axes of the two or more graphs are associated with each other.

9. The memory medium of claim 8,
wherein said automatically determining that the first axes of the two or more graphs are associated with each other comprises automatically comparing labels of the first axes of the two or more graphs.

10. A method, comprising:
a computer system displaying a plurality of graphs which each visually represent data on a display, wherein each of the plurality of graphs includes at least two axes, wherein the plurality of graphs includes two or more graphs that each include a first axis of a first axis type, wherein the plurality of graphs further includes one or more additional graphs that do not have any axes of the first axis type;
the computer system creating a first data structure corresponding to the first axis type;
for each respective graph of the two or more graphs, the computer system associating the first axis of the respective graph with the first data structure corresponding to the first axis type, wherein no graph of the one or more additional graphs is associated with the first data structure;
in response to receiving user input specifying a first value of the first axis of a first graph of the two or more graphs, the computer system publishing the first value to the first data structure;
for each respective graph of the two or more graphs other than the first graph, the computer system sending a respective notification to the respective graph indicating that the first value was published to the first data structure in response to determining that the first axis of the respective graph is associated with the first data structure; and
for each respective graph of the two or more graphs other than the first graph, in response to receiving the respective notification indicating that the first value was published to the first data structure, the computer system updating the respective graph by displaying a visual indication at a respective value of the first axis of the respective graph, wherein the respective value corresponds to the first value published to the first data structure; and wherein the computer system does not update any graph of the one or more additional graphs in response to receiving the user input specifying the first value of the first axis of the first graph.

11. The method of claim 10, wherein said receiving the user input specifying the first value of the first axis of the first graph comprises the computer system receiving user input positioning a pointer along the first axis of the first graph.

12. The method of claim 10, wherein said displaying the visual indication at the respective value of the first axis of the respective graph comprises positioning a cursor along the first axis of the respective graph at the respective value.

13. The method of claim 10,
wherein the method further comprises:
displaying a video on the display with the plurality of graphs;
determining if the first axis of the first graph corresponds to an axis of the video in response to the user input; and
positioning the video at a frame corresponding to the first value of the first axis of the first graph in response to determining that the first axis of the first graph corresponds to the axis of the video.

14. The method of claim 10, wherein the computer system performs said associating the first axes of the two or more graphs with the first data structure in response to determining that the first axes of the two or more graphs are associated with each other.

15. The method of claim 14,
wherein said determining that the first axes of the two or more graphs are associated with each other comprises the computer system receiving user input directly specifying that the first axes of the two or more graphs are associated with each other.

16. The method of claim 14,
wherein said determining that the first axes of the two or more graphs are associated with each other comprises the computer system automatically determining that the first axes of the two or more graphs are associated with each other without receiving user input directly specifying that the first axes of the two or more graphs are associated with each other.

17. A system, comprising:
one or more processors; and
a memory medium coupled to the one or more processors storing program instructions, wherein the program instructions are executable by the one or more processors to:
display a plurality of graphs which each visually represent data on a display, wherein each of the plurality of graphs includes at least two axes, wherein the plurality of graphs includes two or more graphs that each include a first axis of a first axis type, wherein the plurality of graphs further includes one or more additional graphs that do not have any axes of the first axis type;
create a first data structure corresponding to the first axis type;
for each respective graph of the two or more graphs, associate the first axis of the respective graph with the first data structure corresponding to the first axis type, wherein no graph of the one or more additional graphs is associated with the first data structure;
in response to receiving user input specifying a first value of the first axis of a first graph of the two or more graphs, publish the first value to the first data structure;

for each respective graph of the two or more graphs other than the first graph, send a respective notification to the respective graph indicating that the first value was published to the first data structure in response to determining that the first axis of the respective graph is associated with the first data structure; and for each respective graph of the two or more graphs other than the first graph, in response to receiving the respective notification indicating that the first value was published to the first data structure, update the respective graph by displaying a visual indication at a respective value of the first axis of the respective graph, wherein the respective value corresponds to the first value published to the first data structure; and determine not to update any graph of the one or more additional graphs in response to receiving the user input specifying the first value of the first axis of the first graph.

\* \* \* \* \*